(12) United States Patent
Jayasingh et al.

(10) Patent No.: US 12,505,120 B1
(45) Date of Patent: Dec. 23, 2025

(54) SYSTEM AND METHOD FOR SYNCHRONIZING DATA ACROSS A PLURALITY OF DATACENTERS

(71) Applicant: Bank of America Corporation, Charlotte, NC (US)

(72) Inventors: Magaranth Jayasingh, Chennai (IN); Vimal Chandroliya, Gandhinagar (IN); Rajesh Natarajan, Chennai (IN); Preethi Jagadeesan, Chennai (IN); Dhivya Dk, Chennai (IN); Sphurti Milind Deorukhkar, Mumbai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/748,523

(22) Filed: Jun. 20, 2024

(51) Int. Cl.
  *G06F 16/27* (2019.01)
  *G06F 16/22* (2019.01)

(52) U.S. Cl.
  CPC .......... *G06F 16/27* (2019.01); *G06F 16/2246* (2019.01)

(58) Field of Classification Search
  CPC .............................. G06F 16/27; G06F 16/2246
  See application file for complete search history.

(56) References Cited

U.S. PATENT DOCUMENTS

| | | | |
|---|---|---|---|
| 6,920,540 B2 | 7/2005 | Hampel et al. | |
| 7,639,764 B2 | 12/2009 | Cohen | |
| 7,720,189 B2 | 5/2010 | Do et al. | |
| 8,713,038 B2 | 4/2014 | Cohen et al. | |
| 8,850,258 B2 | 9/2014 | Lossin et al. | |
| 8,972,986 B2 | 3/2015 | Palanisamy et al. | |
| 9,705,730 B1 | 7/2017 | Petri et al. | |
| 10,405,312 B2 | 9/2019 | Rong et al. | |
| 10,447,480 B2 | 10/2019 | Alas et al. | |
| 10,725,956 B2 | 7/2020 | Eilert et al. | |
| 10,860,550 B1* | 12/2020 | Chheda | G06F 16/213 |
| 2016/0110261 A1 | 4/2016 | Parab et al. | |
| 2018/0373729 A1* | 12/2018 | Mathurin | G06F 16/282 |
| 2020/0349074 A1* | 11/2020 | Kucherov | G06F 3/0619 |
| 2022/0027118 A1* | 1/2022 | Hinckley | G06F 3/1454 |
| 2023/0253036 A1 | 8/2023 | Hakjune et al. | |

FOREIGN PATENT DOCUMENTS

| | | |
|---|---|---|
| CN | 110493325 B | 12/2020 |
| TW | 1743221 B | 10/2021 |
| WO | 144302 A1 | 8/2018 |

* cited by examiner

*Primary Examiner* — Huawen A Peng (57) ABSTRACT

A method is provided that includes generating a first image of first memory blocks stored in a first database that includes a first hierarchical structure, and generating a second image of second memory blocks stored in a second database that includes a second hierarchical structure. The method includes processing the first and second images to identify a visual change between the first and second hierarchical structures. The method includes determining whether the first and second hierarchical structures are desynchronized based on the visual change. In response to determining that the first and second hierarchical structures are desynchronized, the method includes synchronizing a first set of user data in the first memory blocks with a second set of user data in the second memory blocks.

20 Claims, 2 Drawing Sheets

SYSTEM AND METHOD FOR SYNCHRONIZING DATA ACROSS A PLURALITY OF DATACENTERS

TECHNICAL FIELD

This disclosure generally relates to network communications and data security. More particularly, this disclosure relates to a system and method for synchronizing data across a plurality of datacenters.

BACKGROUND

Entity servers may store data in datacenters. Data stored within the datacenters may be inconsistent, leading to issues in data availability, data recovery, and data consistency for the entity server.

SUMMARY

Entity servers may store user data in a primary data center and replicate the user data across multiple datacenters. However, entity servers struggle with real-time data replication across the multiple data centers. For example, data centers face issues with adaptability, efficiency, and security in dynamic computing environments. Furthermore, data centers introduce latency, which hinders instantaneous updates and may impact the accuracy of updating the information across the multiple datacenters.

The systems and methods described in the present disclosure provide practical applications and technical advantages that overcome technical problems associated with data centers. User data is stored across multiple databases that are configured to store the user data in memory blocks. The provided systems and methods may process the user data in the memory blocks to generate images that include a hierarchical structures of the memory blocks. The provided systems and methos may process the images to identify one or more visual changes indicative of modifications between the hierarchical structures. Databases that do not contain visual changes between the hierarchical structures are classified as being synchronized, and databases that do contain one or more visual changes are classified as being desynchronized. The one or more visual changes may include, but are not limited to, an empty memory block indicative of deleted user data, a color embedded memory block indicative of updated user data, or a new memory block indicative of new user data. The provided systems and methods of the present disclosure may use artificial intelligence to identify and magnify patterns in the hierarchical structures that experience frequent changes over time. Comparing the hierarchical structures may initially be performed using a user defined scanning route that may be updated using the artificial intelligence to focus on frequently changing regions in the hierarchical structure to improve scanning efficiency for detecting visual changes across the hierarchical structures.

The provided systems and methods provide several practical applications. First, the provided systems and methods improve the underlying technology by improving data availability. For example, the provided entity server may efficiently replicate data across the plurality of databases to allow users to access their user data on demand, even if one database is undergoing maintenance or failure. By synchronizing the data across multiple databases, the entity server can achieve high data availability, thereby improving the underlying technology. Second, the provided systems and methods improve the underlying technology by providing improved data recovery. In the event that one database fails or is destroyed (e.g., fire or natural occurring event), the synchronization of the user data across multiple databases mitigates the impact of such events. Finally, the provided systems and methods improve the underlying technology by improving data accuracy. For example, routinely synchronizing the user data cross the plurality of databases using the provided systems and methods improves data accuracy across the databases.

In one embodiment, a system is provided. The system includes a first database operable to store a first set of user data in a first plurality of memory blocks and a second database operable to store a second set of user data in a second plurality of memory blocks. At least a portion of the second set of user data in the second plurality of memory blocks may include a replication of the first set of user data in the first plurality of memory blocks. The system includes a processor operably coupled to the first memory and the second memory. The processor is configured to generate a first image of the first plurality of memory blocks, where the first image comprises a first hierarchical structure of the first plurality of memory blocks. The processor is configured to generate a second image of the second plurality of memory blocks, where the second image comprises a second hierarchical structure of the plurality of memory blocks. The processor is configured to compare the first hierarchical structure in the first image to the second hierarchical structure in the second image. The processor is configured to process the first image and the second image to identify one or more visual changes between the first hierarchical structure in the first image and the second hierarchical structure in the second image. The one or more visual change may include one or more of: an empty memory block indicative of deleted user data, a color embedded memory block indicative of updated user data, or a new memory block indicative of new user data. The processor is configured to determine whether the second hierarchical structure and the first hierarchical structure are desynchronized based on the one or more visual changes that exist between the first hierarchical structure in the first image and the second hierarchical structure in the second image. In response to determining that the second hierarchical structure and the first hierarchical structure are desynchronized, the processor is further configured to synchronize the first set of user data in the first plurality of memory blocks and the second set of user data in the second plurality of memory blocks, wherein synchronizing includes updating either the first set of user data in the first plurality of memory blocks or the second set of user data in the second plurality of memory blocks to include user data associated with the one or more visual changes that exist between the first hierarchical structure and the second hierarchical structure.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
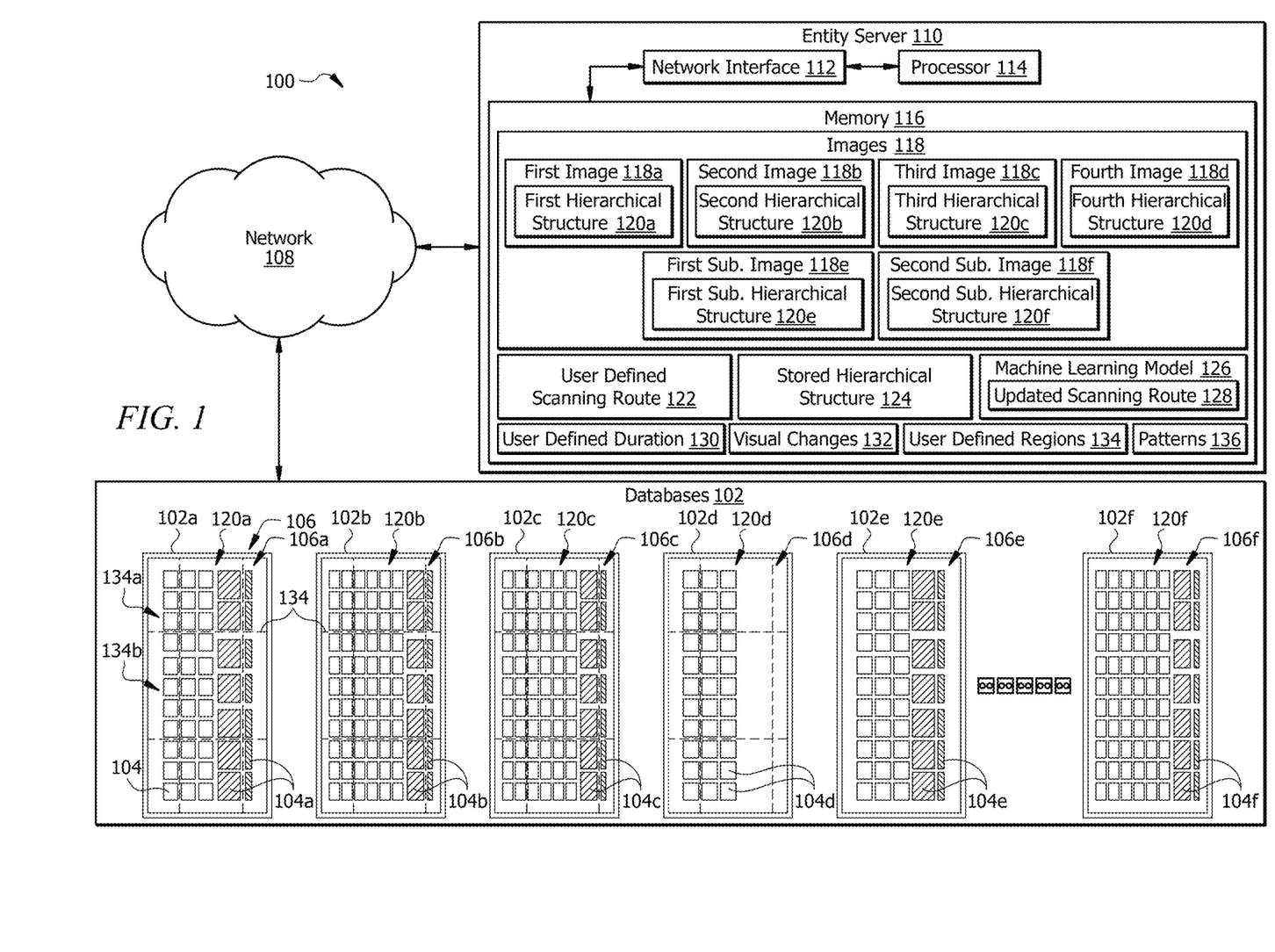
FIG. 1 illustrates an embodiment of a system according to an embodiment of the present disclosure.

FIG. 1 illustrates a system 100 according to an embodiment of the present disclosure. In general, the system 100 includes one or more databases 102, a network 108, and an entity server 110. In some embodiments, the one or more databases 102 (e.g., a first database 102a, a second database 102b, a third database 102c, a fourth database 102d, a fifth database 102e, an Nth database 102f) are operable to store user data 104 (e.g., a first set of user data 104a, a second set of user data 104b, a third set of user data 104c, a fourth set of user data 104d, a fifth set of user data 104e, an Nth set of user data 104f). The user data 104 may be stored in the one or more databases 102 in a plurality of memory blocks 106 (e.g., a first memory block 106a, a second memory block 106b, a third memory block 106c, a fourth memory block 106d, a fifth memory block 106e, an Nth memory block 106f). As discussed above, the one or more databases 102 are configured to replicate the user data 104 across the one or more databases 102. However, in some instance, the user data 104 between the one or more databases 102 may become desynchronized (e.g., one or more of the databases 102 may include an empty memory block 106, updated user data 104, or new user data 104 that is out of sync with the other databases 102).

In some embodiments, the entity server 110 is configured to generate one or more images 118 of the memory blocks 106. For example, the entity server 110 may generate a first image 118a of the first plurality of memory blocks 106a, where the first image 118a comprises a first hierarchical structure 120a of the first plurality of memory blocks 106. The entity server 110 may generate a second image 118b of the second plurality of memory blocks 106b, where the second image 118b comprises a second hierarchical structure 120b of the second plurality of memory blocks 106b. The entity server 110 may be configured to compare the first hierarchical structure 120a in the first image 118a to the second hierarchical structure 120b in the second image 118b. The entity server 110 may process the first image 118a and the second image 118b to identity one or more visual changes 132 between the first hierarchical structure 120a in the first image 118a and the second hierarchical structure 120b in the second image 118b. The one or more visual changes 132 may include, but are not limited to, an empty memory block 106 indicative of deleted user data 104, a color embedded memory block 106 indicative of updated user data 104, or a new memory block 106 indicative of new user data 104. The entity server 110 may determine whether the second hierarchical structure 120b and the first hierarchical structure 120a are desynchronized based on the one or more visual changes 132 that exist between the first hierarchical structure 120a in the first image 118a and the second hierarchical structure 120b in the second image 118b. In response to determining that the second hierarchical structure 120b and the first hierarchical structure 120a are desynchronized, the entity server 110 may synchronize the first set of user data 104a in the first plurality of memory blocks 106a and the second set of user data 104b in the second plurality of memory blocks 106b. For example, synchronizing may include updating either the first set of user data 104a in the first plurality of memory blocks 106a or the second set of user data 104b in the second plurality of memory blocks 106b to include user data 104 associated with the one or more visual changes 132 that exist between the first hierarchical structure 120a and the second hierarchical structure 120b.

System Components of FIG. 1

Database

In some embodiments, the one or more databases 102 (e.g., a first database 102a, a second database 102b, a third database 102c, a fourth database 102d, a fifth database 102e, an Nth database 102f) are operable to store user data 104 (e.g., a first set of user data 104a, a second set of user data 104b, a third set of user data 104c, a fourth set of user data 104d, a fifth set of user data 104e, an Nth set of user data 104f). The user data 104 may be stored in the one or more databases 102 in a plurality of memory blocks 106 (e.g., a first memory block 106a, a second memory block 106b, a third memory block 106c, a fourth memory block 106d, a fifth memory block 106e, an Nth memory block 106f). As discussed above, the one or more databases 102 are configured to replicate the user data 104 across the one or more databases 102. However, in some instance, the user data 104 between the one or more databases 102 may become desynchronized (e.g., one or more of the databases 102 may include an empty memory block 106, updated user data 104, or new user data 104 that is out of sync with the other databases 102).

The one or more databases 102 may comprises memories that are volatile or non-volatile and may comprise read-only memory (ROM), random-access memory (RAM), ternary content-addressable memory (TCAM), dynamic random-access memory (DRAM), and static random-access memory (SRAM). The one or more databases 102 may include one or more of a local database, cloud database, network-attached storage (NAS), etc. The one or more databases 102 comprises one or more disks, tape drives, or solid-state drives, and may be used as an over-flow data storage device, to store programs when such programs are selected for execution, and to store instructions and data that are read during program execution.

Network

Network 108 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 108 may be configured to support any suitable type of communication protocol as would be appreciated by one of ordinary skill in the art. In some embodiments, the network 108 facilitates the transfer of data between the one or more databases 102 and the entity server 110.

Entity Server

The entity server 110 comprises a processor 114 operably coupled with a network interface 112 and a memory 116. The processor 114 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 114 may be a programmable logic device, a microcontroller, a microprocessor, or any suitable number and combination of the preceding. The one or more processors are configured to process data and may be implemented in hardware or software. For example, the processor 114 may be 8-bit, 16-bit, 32-bit, 64-bit, or of any other suitable architecture. The processor 114 may include an arithmetic logic unit (ALU) for performing arithmetic and logic operations. The processor 114 may register the supply operands to the ALU and store the results of ALU operations. The processor 114 may further include a control unit that fetches instructions from memory and executes them by directing the coordinated operations of the ALU, registers, and other components. The one or more processors are configured to implement various software instructions. In this way, processor 114 may be a special-purpose computer designed to implement the functions disclosed herein. In an embodiment, the processor 114 is implemented using logic units, FPGAs, ASICs, DSPs, or any other suitable hardware. The processor 114 is configured to operate as described in FIGS. 1-2. For example, the processor 114 may be configured to perform one or more operations of the operational flow 200 as described in FIG. 2.

The network interface 112 is configured to enable wired and/or wireless communications between the entity server 110, the network 108, and the one or more databases 102. Suitable network interfaces 112 include an NFC interface, a Bluetooth interface, a Zigbee interface, a Z-wave interface, a radio-frequency identification (RFID) interface, a WIFI interface, a local area network (LAN) interface, a wide area network (WAN) interface, a metropolitan area network (MAN) interface, a personal area network (PAN) interface, a wireless PAN (WPAN) interface, a modem, a switch, and/or a router. The network interface 112 may be configured to use any suitable type of communication protocol as would be appreciated by one of ordinary skill in the art.

The memory 116 may be volatile or non-volatile and may comprise read-only memory (ROM), random-access memory (RAM), ternary content-addressable memory (TCAM), dynamic random-access memory (DRAM), and static random-access memory (SRAM). The memory 116 may include one or more of a local database, cloud database, network-attached storage (NAS), etc. The memory 116 comprises one or more disks, tape drives, or solid-state drives, and may be used as an over-flow data storage device, to store programs when such programs are selected for execution, and to store instructions and data that are read during program execution. The memory 116 may comprise non-transitory computer-readable medium. The memory 116 may store any of the information described in FIGS. 1-2 along with any other data, instructions, logic, rules, or code operable to implement the function(s) described herein when executed by processor 114.

The memory 116 may be operable to store the images 118 generated by the processor 114. For example, the images 118 generated by the processor 114 may include a first image 118*a* of the first plurality of memory blocks 106*a* that includes a first hierarchical structure 120*a*. In some embodiments, the term "hierarchical structure" may refer to a data structure, or otherwise an arrangement of the data, within the memory blocks 106 of the databases 102. The images 118 may be a representation of the hierarchical structure. The images 118 may include a second image 118*b* of the second plurality of memory blocks 106*b* that includes a second hierarchical structure 120*b*, a third image 118*c* of the third plurality of memory blocks 106*c* that includes a third hierarchical structure 120*c*, a fourth image 118*d* of the fourth plurality of memory blocks 106*d* that includes a fourth hierarchical structure 120*d*, or any number of images that represent the memory blocks 106 in the one or more databases 102. In some embodiments, the entity server 110 may generate subsequent images 118 of memory blocks 106 to determine if any changes to the user data 104 have occurred after a duration has elapsed. In these embodiments, the images 118 may include a first subsequent image 118*e* of first plurality of memory blocks 106*a* that includes a first subsequent hierarchical structure 120*e* and a second subsequent image 118*f* of the second plurality of memory blocks 106*b* that includes a second subsequent hierarchical structure 120*f*. The memory 116 may also be operable to store a user defined scanning route 122, a plurality of stored hierarchical structures 124 (e.g., previously acquired hierarchical structures), a machine learning model 126 that may be configured to generate an updated scanning route 128, a user defined duration 130, the one or more visual changes 132, user defined regions 134, and patterns 136, which will be detailed below.

Example Operation

Figure 2:
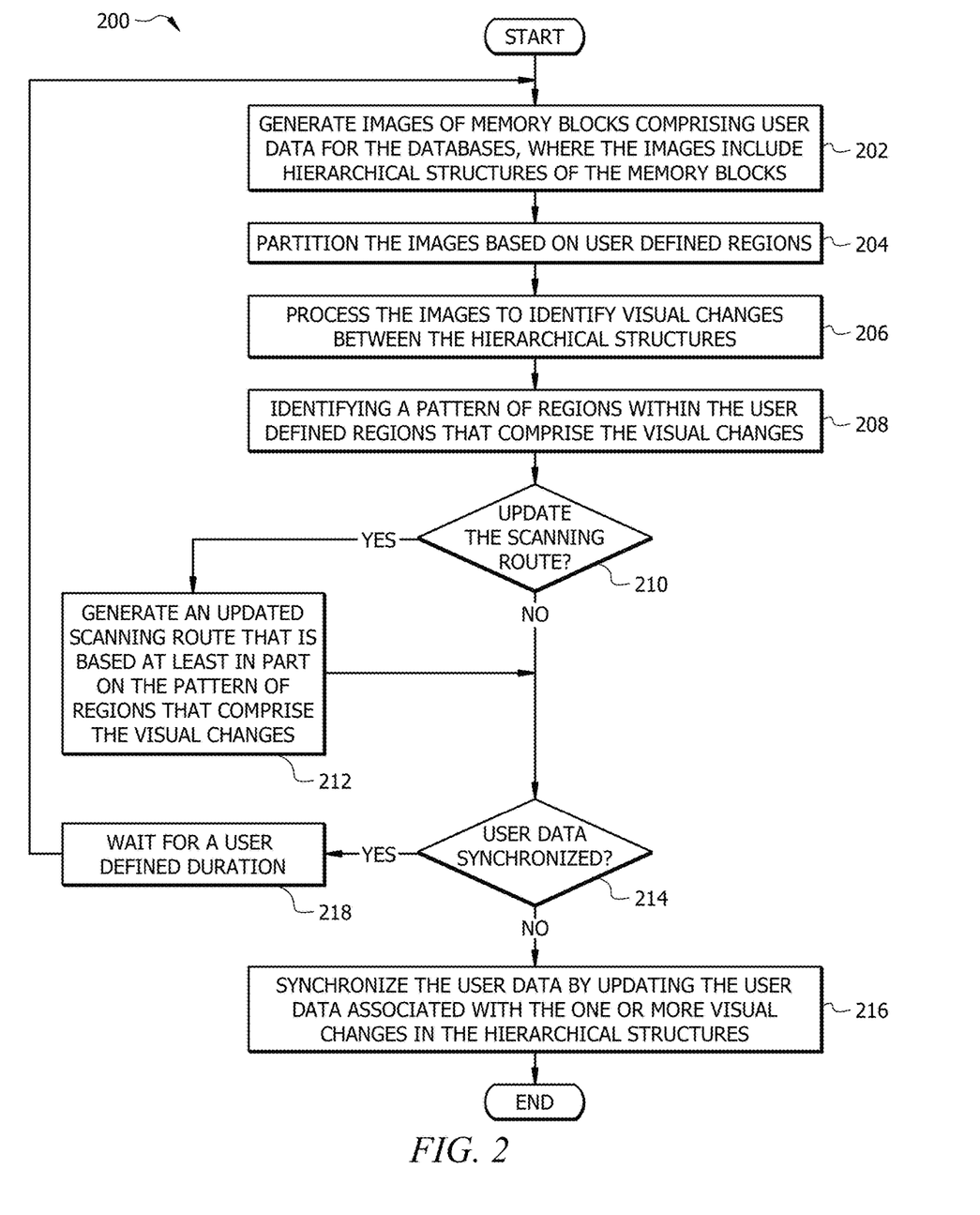
FIG. 2 illustrates a flowchart of a method according to an embodiment of the present disclosure.

FIG. 2 illustrates an operational flow 200 according to one embodiment of the present disclosure. The operational flow 200 can logically be described in three parts. The first part includes operations 202-206, which generally includes generating images 118 of the memory blocks 106 that include a hierarchical structure 120*a-f* of the memory blocks 106, partitioning the images 118 based on one or more user defined regions 134, and processing the images 118 to identify one or more visual changes 132 between the hierarchical structures 120*a-f*. The second part includes operations 208-212, which generally includes identifying a pattern 136 of regions within the user defined regions 134 that comprise the one or more visual changes 132, and determining whether the operational flow 200 should update the scanning route for how the operational flow 200 compares the hierarchical structures 120*a-f* in the images 118. If it is determined that the operational flow 200 should update the scanning route, the operational flow 200 includes generating an updated scanning route that is based at least in part on the pattern 136 of regions that comprise the one or more visual changes 132. The third part includes operations 214-218, which generally include determining whether the hierarchical structures 120*a-f* are desynchronized based on the one or more visual changes 132 that exist between the hierarchical structures 120*a-f*. If it is determined that no visual changes 132 exist between the hierarchical structures 120*a-f*, then then operational flow 200 may wait for the user defined duration 130, and repeat operations 202-216. If it is determined that one or more visual changes132 exist between the hierarchical structures 120*a-f*, then the operational flow 200 includes synchronizing the user data 104 in the memory blocks 106, where synchronizing includes updating the user data 104 in hierarchical structures 120*a-f* to include user data 104 associated with the one or more visual changes.

At operation 202, the operational flow 200 includes generating images 118 of the memory blocks 106 that include hierarchical structures 120*a-f* of the memory blocks 106. For example, operation 202 may include generating a first image 118*a* of the first plurality of memory blocks 106*a*, where the first image 118*a* includes a first hierarchical structure 120*a* of the first plurality of memory blocks 106*a*. Operation 202 may further include generating a second image 118*b* of the second plurality of memory blocks 106*b*, where the second image 118*b* includes a second hierarchical structure 120*b* of the second plurality of memory blocks 106*b*. The processor 114 may receive the user data 104 from the memory blocks 106 and process the user data 104 to generate the images 118. In some embodiments, the processor 114 may generate the images 118 using software that includes, but is not limited to, Java, JavaScript, D3.js, python, or the like. FIG. 1 illustrates exemplary hierarchical structures 120a-f that may be generated to represent the memory blocks 106.

In some embodiments, at operation 202 the operational flow 200 includes mapping user data 104 in the memory blocks 106 between the one or more databases 102. For example, operation 202 may include mapping a first set of user data 104a in the first database 102a to a second set of user data 104b in the second database 102b, where the second set of user data 104b is a replication of the first set of user data 104a in the first database 102a. For example, the upper left memory block 106 in the first database 102a may include user data 104 that is replicated in the upper left memory block 106 in the second database 102b. Operation 202 may provide a mapping to indicate that the upper left memory block 106 in the first database 102a is replicated within in the upper left memory block 106 in the second database 102b. In this example, the memory blocks 106 are located in the same relative position, but operation 202 may also establish a mapping between replicated user data 104 that is in different relative positions between the databases 102 For example, the upper left memory block 106 in the first database 102a may be replicated by the bottom left memory block 106 in the second database 102b. Replicated user data 104 between the databases 102 may be illustrated as the same shape and/or color embedding in the hierarchical structures 120a-f in the generated images 118. Changes between the user data 104 within the images 118 may be illustrated in different ways. For example, the processor 114 may illustrate deleted user data 104 in the images 118 as empty memory blocks (i.e., not illustrated in the images 118), updated user data 104 may be illustrated with a color embedding, and new user data 104 may be illustrated in the image 118 as a new memory block 106. For example, the processor 114 may embed a color in the memory blocks 106 to generate a color embedded memory block 106 indicative of the updated user data.

At operation 204, the operational flow 200 may include partitioning the one or more images 118 based on user defined regions 134. For example, as shown in FIG. 1, the processor 114 may partition, or otherwise divide, the images 118 into user defined regions 134 (e.g., sub-regions). In one embodiment, the processor 114 may establish a grid and partition the one or more images 118 into a plurality of sub-regions (e.g., 134a, 134b, etc.) within the grid. Although the user defined regions 134 illustrated in FIG. 1 are rectangular, the sub-regions may have any geometric shape suitable to partition the image 118 into sub regions including, but not limited to, triangles, quadrilaterals, polygons, and curved shapes. The user defined regions 134 may include any number of sub-regions, e.g., at least two sub-regions, at least 10 sub-regions, at least 50 sub-regions, to at least one hundred sub-regions, to less than one thousand sub-regions, to less than ten thousand sub-regions, to less than one hundred thousand sub-regions, etc.

At operation 206, the operational flow 200 includes processing the images 118 to identify one or more visual changes between the hierarchical structures 120a-f. For example, operation 206 may include comparing the first hierarchical structure 120a in the first image 118a to the second hierarchical structure 120b in the second image 118b, and identifying one or more visual changes 132 that exist between the first hierarchical structure 120a and the second hierarchical structure 120b. In some embodiments, the one or more visual changes 132 may include, but are not limited to, an empty memory block 106 that is indicative of deleted user data 104 (e.g., see empty memory blocks 106 in the fourth hierarchical structure 120d), a color embedded memory block 106 indicative of updated user data 104, or a new memory block 106 indicative of new user data 104.

In some embodiments, operation 206 may process the images 118 based on an initial user defined scanning route 122. In some embodiments, the initial user defined scanning route 122 is configured to define a route for traversing through the user defined regions 134 to identify the one or more visual changes 132. For example, in one embodiment, the user defined scanning route 122 may traverse through each successive column in the user defined regions 134 to identify the visual changes 132. In another example, the user defined scanning route 122 may traverse through each successive row in the user defined regions 134 to identify the visual changes 132

At operation 208, the operational flow 200 includes processing the images 118 using a machine learning model 126 and the initial user defined scanning route 122 to identify a pattern 136 of the regions within the user defined regions 134 that comprise the one or more visual changes 132. The machine learning model 126 may comprise a support vector machine, neural network, random forest, or k-means clustering. In another example, the machine learning model 126 may be implemented by a plurality of neural network (NN) layers, Convolutional NN (CNN) layers, Long-Short-Term-Memory (LSTM) layers, Bi-directional LSTM layers, or Recurrent NN (RNN) layers. In another example, the machine learning model 126 may be implemented by Natural Language Processing (NLP). In some embodiments, the machine learning model 126 may be trained based at least in part on the stored hierarchical structures 124 in the memory 116. The stored hierarchical structures 124 in the memory 116 may include a data log of previously acquired hierarchical structures 120a-f by the entity server 110.

In some embodiments, the pattern 136 of regions may include areas within the hierarchical structures 120a-f that experience frequent changes, additions, or deletions of user data 104 over time. That is, the machine learning model 126 may assign values to regions that experience frequent visual changes 132 associated with changes, additions, and deletions of user data 104 when analyzing the hierarchical structures 120a-f over time and add these values together to generate the pattern 136 over time. For example, regions with frequent changes, additions, or deletions over time will have greater values (e.g., a greater intensity) relative to regions with less frequent changes, additions, or deletions.

At decision block 210, the operational flow 200 includes determining whether to update the user defined scanning route 122. In some embodiments, the operational flow 200 may process the images 118 with the user defined scanning route 122 before proceeding to operation 212 to generate an updated scanning route 128 using the machine learning model 126. That is, the operational flow 200 may build up a threshold number of stored hierarchical structures 124 in the memory 116 using the user defined scanning route 122 over time prior to using the machine learning model 126 to generate the updated scanning route 128. The threshold number may include generating at least one stored hierarchical structure 124 for one or more of the databases 102, at least five, at least ten, to less than 50, less than 100, or less than 1000 stored hierarchical structures 124 for one or more of the databases 102. If the stored hierarchical structures 124 is less than the threshold number, the operational flow 200 may proceed to decision block 214. If the stored hierarchical structures 124 is greater than the threshold number, the operational flow 200 may proceed to operation 212.

At operation 212, the operational flow 200 includes using the machine learning model 126 to generate an updated scanning route 128 that is based at least in part on the pattern 136 of regions that comprise the one or more visual changes 132. In some embodiments, the updated scanning route 128 is configured to define an updated route for traversing through the user defined regions 134, where the updated scanning route 128 prioritizes traversing through the pattern 136 of regions comprising the one or more visual changes 132 before traversing through alternative regions in the user defined regions 134. In some embodiments, the updated scanning route 128 may improve scanning efficiency for processing the images 118 to identify the one or more visual changes 132 between the hierarchical structures 120a-f.

At decision block 214, the operational flow 200 includes determining whether the hierarchical structures 120a-f are desynchronized based on the one or more visual changes 132 that exist between the hierarchical structures 120a-f. For example, decision block 214 may include determining whether the second hierarchical structure 120b and the first hierarchical structure 120a are desynchronized based on one or more visual changes 132 that exist between the first hierarchical structure 120a in the first image 118a and the second hierarchical structure 120b in the second image 118b. If one or more visual changes 132 exist (e.g., an empty memory block 106 indicative of deleted user data 104, a color embedded memory block 106 indicative of updated user data 104, or a new memory block 106 indicative of new user data 104), then the operational flow 200 proceeds to operation 216.

At operation 216, the operational flow 200 includes synchronizing the user data 104 in the memory blocks 106 for the one or more databases 102. For example, synchronizing the user data 104 may include updating the one or more databases 102 to account for the one or more visual changes 132 such that each of the databases 102 replicates that user data 104 from the other respective databases 102. In one non-limiting example, operation 216 may include synchronizing the first set of user data 104a in the first plurality of memory blocks 106a and the second set of user data 104b in the second plurality of memory blocks 106b. For example, synchronizing may include updating either the first set of user data 104a in the first plurality of memory blocks 106a or the second set of user data 104b in the second plurality of memory blocks 106b to include the user data 104 associated with the one or more visual changes 132 that exist between the first hierarchical structure 120a and the second hierarchical structure 120b. As shown in FIG. 1, the second hierarchical structure 120b includes memory blocks 106 that are not present in the first hierarchical structure 120a. If the first hierarchical structure 120a is the primary database 102, the operational flow 200 may include synchronizing the second hierarchical structure 120b to match the first hierarchical structure 120a (e.g., remove user data 104 such that second hierarchical structure 120b matches the first hierarchical structure 120a). Similarly, if the second hierarchical structure 120b is the primary database 102, the operational flow 200 may include synchronizing the first hierarchical structure 120a to match the second hierarchical structure 120b (e.g., add user data 104 such that the first hierarchical structure 120a matches the second hierarchical structure 120b).

If no visual changes 132 exist between the first hierarchical structure 120a and the second hierarchical structure 120b, decision block 214 may determine that the first hierarchical structure 120a and the second hierarchical structure 120b are synchronized, and the operational flow 200 may proceed to operation 218. At operation 218, the operational flow 200 includes waiting for a user defined duration 130 before repeating operations 202-214. The user defined duration 130 may be any amount of time, e.g., one minute, five minutes, thirty minutes, an hour, six hours, a day, a week, or a month.

When repeating operations 202-214, the operational flow 200 may utilize the updated scanning route 128 while acquiring subsequent images 118. For example, while repeating operation 202, the operational flow may generate a first subsequent image 118e of the first plurality of memory blocks 106a after the user defined duration 130 has elapsed, where the first subsequent image of the first plurality of memory blocks 106a comprises a first subsequent hierarchical structure 120e. Repeating operation 202 may further include generating a second subsequent image 118f of the second plurality of memory blocks 106b after the user defined duration 130 has elapsed, where the second subsequent image 118f of the second plurality of memory blocks 106b comprises a second subsequent hierarchical structure 120f of the second plurality of memory blocks 106b. The operational flow may repeat operation 204, which includes partitioning the first subsequent image 118e of the first plurality of memory blocks 106a into the user defined regions 134 and partitioning the second subsequent image 118f of the second plurality of memory blocks 106b into the user defined regions 134. The operational flow 200 may repeat operations 206-210, which may include processing the first subsequent image 118e and the second subsequent image 118f to identify one or more visual changes 132 that exist between the first subsequent hierarchical structure 120e in the first subsequent image 118e and the second subsequent hierarchical structure 120f in the second subsequent image 118f. As detailed above, processing of the user defined regions 134 to identify the one or more visual changes 132 may follow the updated scanning route 128 generated by the machine learning model 126. The operational flow 200 may repeat 210-212, as detailed above, to generate another updated scanning route 128 using the machine learning model 126. The operational flow 200 may repeat decision block 214, as detailed above, to determine whether the second subsequent hierarchical structure 120f and the first subsequent hierarchical structure 120e are desynchronized. If desynchronized, the operational flow may proceed to operation 216 to synchronize the first subsequent hierarchical structure 120e and the second subsequent hierarchical structure 120f, as detailed above. Once synchronized, the operational flow 200 may end 220.

In one non-limiting example use case, the system 100 may include at least four databases 102. For example, the system 100 may include a first database 102a operable to store a first set of user data 104a in the first plurality of memory blocks 106a, a second database 102b operable to store a second set of user data 104b in a second plurality of memory blocks 106b, a third database 102c operable to store a third set of user data 104c in a third plurality of memory blocks 106c, and a fourth database 102d operable to store a fourth set of user data 104d in a fourth plurality of memory blocks 106d. In some embodiments, at least a portion of the second set of user data 104b, the third set of user data 104c, and the fourth set of user data 104d are a replication of the first set of user data 104a. The processor 114 may be configured to generate a first image 118a of the first plurality of memory blocks 106a that includes a first hierarchical structure 120a, generate a second image 118b of the second plurality of memory blocks 106b that includes the second hierarchical structure 120b, generate a third image 118c of the third plurality of memory blocks 106c that includes a third hierarchical structure 120c, and generate a fourth image 118d of the fourth plurality of memory blocks 106d that includes a fourth hierarchical structure 120d. The processor 114 may process the first image 118a, the second image 118b, the third image 118c, and the fourth image 118d, as detailed above, to identify the one or more visual changes 132 between the first hierarchical structure 120a, the second hierarchical structure 120b, the third hierarchical structure 120c, and the fourth hierarchical structure 120d. Referring to FIG. 1, the processor 114 may determine that the second hierarchical structure 120b and the third hierarchical structure 120c are synchronized (e.g., do not include one or more visual changes 132 between the second hierarchical structure 120b and the third hierarchical structure 120c). The processor 114 may determine that the first hierarchical structure 120a and the fourth hierarchical structure 120d are desynchronized based on the one or more visual changes 132 that exist between the first hierarchical structure 120a, the second hierarchical structure 120b, the third hierarchical structure 120c, and the fourth hierarchical structure 120d.

In response to determining that the first hierarchical structure 120a and the fourth hierarchical structure 120d are desynchronized, the processor 114 may be configured to synchronize the first set of user data 104a in the first plurality of memory blocks 106a with the second set of user data 104b in the second plurality of memory blocks 106b and the third set of user data 104c in the third plurality of memory blocks 106c based on the one or more visual changes 132. For example, in FIG. 1, the second hierarchical structure 120b and the third hierarchical structure 120c include additional memory blocks 106 that are not present in the first hierarchical. Synchronizing the first set of user data 104a may include adding in the additional memory blocks 106 to the first plurality of memory blocks 106a. The processor 114 may be further configured to synchronize the fourth set of user data 104d in the fourth plurality of memory blocks 106d with the second set of user data 104b in the second plurality of memory blocks 106b and the third set of user data 104c in the third plurality of memory blocks 106c based on the one or more visual changes 132. For example, in FIG. 1, the second hierarchical structure 120b and the third hierarchical structure 120c include additional memory blocks 106 that are not present in the fourth hierarchical structure 120d. Synchronizing the fourth set of user data 104d may include adding in the additional memory blocks 106 to the fourth plurality of memory blocks 106d.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

The invention claimed is:

1. A system comprising:
a first database operable to store a first set of user data in a first plurality of memory blocks;
a second database operable to store a second set of user data in a second plurality of memory blocks, wherein at least a portion of the second set of user data in the second plurality of memory blocks are a replication of the first set of user data in the first plurality of memory blocks; and
a processor operably coupled to the first database and the second database, wherein the processor is configured to:
generate a first image of the first plurality of memory blocks, wherein the first image comprises a first hierarchical structure of the first plurality of memory blocks;
generate a second image of the second plurality of memory blocks, wherein the second image comprises a second hierarchical structure of the second plurality of memory blocks;
process the first image and the second image to identify one or more visual changes between the first hierarchical structure in the first image and the second hierarchical structure in the second image, wherein the one or more visual changes includes one or more of: an empty memory block indicative of deleted user data, a color embedded memory block indicative of updated user data, or a new memory block indicative of new user data;
determine whether the second hierarchical structure and the first hierarchical structure are desynchronized based on the one or more visual changes that exist between the first hierarchical structure in the first image and the second hierarchical structure in the second image; and
in response to determining that the second hierarchical structure and the first hierarchical structure are desynchronized, the processor is further configured to:
synchronize the first set of user data in the first plurality of memory blocks and the second set of user data in the second plurality of memory blocks, wherein synchronizing includes updating either the first set of user data in the first plurality of memory blocks or the second set of user data in the second plurality of memory blocks to include user data associated with the one or more visual changes that exist between the first hierarchical structure and the second hierarchical structure.

2. The system of claim 1, wherein during generating the first image and the second image, the processor is further configured to:
map the first set of user data in the first database to replicated user data in the second database;
identify a first memory block in the first database that comprises the updated user data relative to a corresponding first memory block in the second database; and
process the first hierarchical structure in the first image to embed a color in the first memory block to generate a first color embedded memory block indicative of the updated user data.

3. The system of claim 1 further comprising:
a third database operable to store a third set of user data in a third plurality of memory blocks, wherein at least a portion of the third set of user data in the third plurality of memory blocks are a replication of the first set of user data in the first plurality of memory blocks;
wherein the processor is operably coupled to the third database, and wherein the processor is further configured to:
  generate a third image of the third plurality of memory blocks, wherein the third image comprises a third hierarchical structure of the third plurality of memory blocks;
  process the third image to identify the one or more visual changes between the first hierarchical structure, the second hierarchical structure, and the third hierarchical structure;
  determine that the second hierarchical structure in the second image and the third hierarchical structure in the third image are synchronized;
  determine that the first hierarchical structure in the first image is desynchronized from the second hierarchical structure and the third hierarchical structure based on the one or more visual changes that exist between the first hierarchical structure, the second hierarchical structure, and the third hierarchical structure; and
  in response to determining that the first image is desynchronized, the processor is further configured to:
    synchronize the first set of user data in the first plurality of memory blocks and with the second set of user data in the second plurality of memory blocks and the third set of user data in the third plurality of memory blocks based on the one or more visual changes.

4. The system of claim 1 further comprising:
a third database operable to store a third set of user data in a third plurality of memory blocks, wherein at least a portion of the third set of user data in the third plurality of memory blocks is a replication of the first set of user data in the first plurality of memory blocks; and
a fourth database operable to store a fourth set of user data in a fourth plurality of memory blocks, wherein at least a portion of the fourth set of user data in the fourth plurality of memory blocks is a replication of the first set of user data in the first plurality of memory blocks;
wherein the processor is operably coupled to the third database and the fourth database, and wherein the processor is further configured to:
  generate a third image of the third plurality of memory blocks, wherein the third image comprises a third hierarchical structure of the third plurality of memory blocks;
  generate a fourth image of the fourth plurality of memory blocks, wherein the fourth image comprises a fourth hierarchical structure of the fourth plurality of memory blocks;
  process the first image, the second image, the third image, and the fourth image to identify the one or more visual changes between the first hierarchical structure, the second hierarchical structure, the third hierarchical structure, and the fourth hierarchical structure;
  determine that the second hierarchical structure and the third hierarchical structure are synchronized;
  determine that the first hierarchical structure and the fourth hierarchical structure are desynchronized based on the one or more visual changes that exist between the first hierarchical structure, the second hierarchical structure, the third hierarchical structure, and the fourth hierarchical structure; and
  in response to determining that the first hierarchical structure and the fourth hierarchical structure are desynchronized, the processor is further configured to:
    synchronize the first set of user data in the first plurality of memory blocks with the second set of user data in the second plurality of memory blocks and the third set of user data in the third plurality of memory blocks based on the one or more visual changes; and
    synchronize the fourth set of user data in the fourth plurality of memory blocks with the second set of user data in the second plurality of memory blocks and the third set of user data in the third plurality of memory blocks based on the one or more visual changes.

5. The system of claim 1, wherein the processor is further configured to:
  mapping the first set of user data in the first database to replicated user data in the second database.

6. The system of claim 1 further comprising:
a memory operable to store a machine learning model, a user defined scanning route, and a plurality of stored hierarchical structures;
wherein the processor is operably coupled to the memory, the processor configured to execute the machine learning model, and wherein after generating the second image of the second plurality of memory blocks, the processor is further configured to:
  partition the first image of the first plurality of memory blocks into user defined regions;
  partition the second image of the second plurality of memory blocks into the user defined regions;
  process the first image and the second image using the machine learning model and the user defined scanning route to identify a pattern of regions within the user defined regions that comprise the one or more visual changes, wherein the machine learning model is trained on the plurality of stored hierarchical structures, and wherein the user defined scanning route is configured to define a route for traversing through the user defined regions to perform the processing; and
  generate an updated scanning route using the machine learning model, wherein the updated scanning route is based at least in part on the pattern of regions that comprise the one or more visual changes, and wherein the updated scanning route is configured to define an updated route for traversing through the user defined regions, wherein the updated route for traversing through the user defined regions prioritizes traversing through the pattern of regions comprising the one or more visual changes before traversing through alternative regions in the user defined regions.

7. The system of claim 6, wherein the memory is operable to store a user defined duration;
wherein the processor is further configured to:
  generate a first subsequent image of the first plurality of memory blocks after the user defined duration has elapsed, wherein the first subsequent image of the first plurality of memory blocks comprises a first subsequent hierarchical structure of the first plurality of memory blocks;
generate a second subsequent image of the second plurality of memory blocks after the user defined duration has elapsed, wherein the second subsequent image of the second plurality of memory blocks comprises a second subsequent hierarchical structure of the second plurality of memory blocks;
partition the first subsequent image of the first plurality of memory blocks into the user defined regions;
partition the second subsequent image of the second plurality of memory blocks into the user defined regions;
process the first subsequent image and the second subsequent image to identify the one or more visual changes between the first subsequent hierarchical structure in the first subsequent image and the second subsequent hierarchical structure in the second subsequent image, wherein the processing follows the updated scanning route;
determine whether the second subsequent hierarchical structure and the first subsequent hierarchical structure are desynchronized based on the one or more visual changes that exist between the first subsequent hierarchical structure in the first subsequent image and the second subsequent hierarchical structure in the second subsequent image; and
in response to determining that the second subsequent hierarchical structure and the first subsequent hierarchical structure are desynchronized, the processor is further configured to:
synchronize the first set of user data in the first plurality of memory blocks and the second set of user data in the second plurality of memory blocks, wherein synchronizing includes updating either the first set of user data in the first plurality of memory blocks or the second set of user data in the second plurality of memory blocks to include user data associated with the one or more visual changes that exist between the first subsequent hierarchical structure and the second subsequent hierarchical structure.

8. A method comprising:
generating a first image of a first plurality of memory blocks stored in a first database that includes a first hierarchical structure of the first plurality of memory blocks, wherein the first plurality of memory blocks are operable to store a first set of user data;
generating a second image of a second plurality of memory blocks in a second database that includes a second hierarchical structure of the second plurality of memory blocks, wherein the second plurality of memory blocks are operable to store a second set of user data, wherein at least a portion of the second set of user data in the second plurality of memory blocks are a replication of the first set of user data in the first plurality of memory blocks;
processing the first image and the second image to identify one or more visual changes between the first hierarchical structure in the first image and the second hierarchical structure in the second image, wherein the one or more visual changes includes one or more of: an empty memory block indicative of deleted user data, a color embedded memory block indicative of updated user data, or a new memory block indicative of new user data;
determining whether the second hierarchical structure and the first hierarchical structure are desynchronized based on the one or more visual changes that exist between the first hierarchical structure in the first image and the second hierarchical structure in the second image; and
in response to determining that the second hierarchical structure and the first hierarchical structure are desynchronized, the method further comprises:
synchronizing the first set of user data in the first plurality of memory blocks and the second set of user data in the second plurality of memory blocks, wherein synchronizing includes updating either the first set of user data in the first plurality of memory blocks or the second set of user data in the second plurality of memory blocks to include user data associated with the one or more visual changes that exist between the first hierarchical structure and the second hierarchical structure.

9. The method of claim 8, wherein during generating the first image and the second image, the method further comprises:
mapping the first set of user data in the first database to replicated user data in the second database;
identifying a first memory block in the first database that comprises updated user data relative to a corresponding first memory block in the second database; and
processing the first hierarchical structure in the first image to embed a color in the first memory block to generate a first color embedded memory block indicative of the updated user data.

10. The method of claim 8 further comprising:
generating a third image of a third plurality of memory blocks in a third database that includes a third hierarchical structure of the third plurality of memory blocks, wherein the third plurality of memory blocks are operable to store a third set of user data, wherein at least a portion of the third set of user data in the third plurality of memory blocks are a replication of the first set of user data stored in the first plurality of memory blocks;
processing the third image to identify the one or more visual changes between the first hierarchical structure, the second hierarchical structure, and the third hierarchical structure;
determining that the second hierarchical structure in the second image and the third hierarchical structure in the third image are synchronized;
determining that the first hierarchical structure in the first image is desynchronized from the second hierarchical structure and the third hierarchical structure based on the one or more visual changes that exist between the first hierarchical structure, the second hierarchical structure, and the third hierarchical structure; and
in response to determining that the first image is desynchronized, the method further comprises:
synchronizing the first set of user data in the first plurality of memory blocks and with the second set of user data in the second plurality of memory blocks and the third set of user data in the third plurality of memory blocks based on the one or more visual changes.

11. The method of claim 8 further comprising:
generating a third image of a third plurality of memory blocks in a third database that includes a third hierarchical structure of the third plurality of memory blocks, wherein the third plurality of memory blocks are operable to store a third set of user data, wherein at least a portion of the third set of user data in the third plurality of memory blocks are a replication of the first set of user data stored in the first plurality of memory blocks;

generating a fourth image of a fourth plurality of memory blocks in a fourth database that includes a fourth hierarchical structure of the fourth plurality of memory blocks, wherein the fourth plurality of memory blocks are operable to store a fourth set of user data, wherein at least a portion of the fourth set of user data in the fourth plurality of memory blocks are a replication of the first set of user data stored in the first plurality of memory blocks;

processing the first image, the second image, the third image, and the fourth image to identify the one or more visual changes between the first hierarchical structure, the second hierarchical structure, the third hierarchical structure, and the fourth hierarchical structure;

determining that that the second hierarchical structure and the third hierarchical structure are synchronized;

determining that the first hierarchical structure and the fourth hierarchical structure are desynchronized based on the one or more visual changes that exist between the first hierarchical structure, the second hierarchical structure, the third hierarchical structure, and the fourth hierarchical structure; and in response to determining that the first hierarchical structure and the fourth hierarchical structure are desynchronized, the method further comprises:

synchronizing the first set of user data in the first plurality of memory blocks with the second set of user data in the second plurality of memory blocks and the third set of user data in the third plurality of memory blocks based on the one or more visual changes; and synchronizing the fourth set of user data in the fourth plurality of memory blocks with the second set of user data in the second plurality of memory blocks and the third set of user data in the third plurality of memory blocks based on the one or more visual changes.

12. The method of claim 8 further comprising:
mapping the first set of user data in the first database to replicated user data in the second database.

13. The method of claim 8 further comprising:
partitioning the first image of the first plurality of memory blocks into user defined regions;
partitioning the second image of the second plurality of memory blocks into the user defined regions;
processing the first image and the second image using a machine learning model and a user defined scanning route to identify a pattern of regions within the user defined regions that comprise the one or more visual changes, wherein the machine learning model is trained on a plurality of stored hierarchical structures, and wherein the user defined scanning route is configured to define a route for traversing through the user defined regions to perform the processing; and
generating an updated scanning route using the machine learning model, wherein the updated scanning route is based at least in part on the pattern of regions that comprise the one or more visual changes, and wherein the updated scanning route is configured to define an updated route for traversing through the user defined regions, wherein the updated route for traversing through the user defined regions prioritizes traversing through the pattern of regions comprising the one or more visual changes before traversing through alternative regions in the user defined regions.

14. The method of claim 13, further comprising:
generating a first subsequent image of the first plurality of memory blocks after a user defined duration has elapsed, wherein the first subsequent image of the first plurality of memory blocks comprises a first subsequent hierarchical structure of the first plurality of memory blocks;
generating a second subsequent image of the second plurality of memory blocks after the user defined duration has elapsed, wherein the second subsequent image of the second plurality of memory blocks comprises a second subsequent hierarchical structure of the second plurality of memory blocks;
partitioning the first subsequent image of the first plurality of memory blocks into the user defined regions;
partitioning the second subsequent image of the second plurality of memory blocks into the user defined regions;
processing the first subsequent image and the second subsequent image to identify the one or more visual changes between the first subsequent hierarchical structure in the first subsequent image and the second subsequent hierarchical structure in the second subsequent image, wherein the processing follows the updated scanning route;
determining whether the second subsequent hierarchical structure and the first subsequent hierarchical structure are desynchronized based on the one or more visual changes that exist between the first subsequent hierarchical structure in the first subsequent image and the second subsequent hierarchical structure in the second subsequent image; and
in response to determining that the second subsequent hierarchical structure and the first subsequent hierarchical structure are desynchronized, the method further comprises:
synchronizing the first set of user data in the first plurality of memory blocks and the second set of user data in the second plurality of memory blocks, wherein synchronizing includes updating either the first set of user data in the first plurality of memory blocks or the second set of user data in the second plurality of memory blocks to include user data associated with the one or more visual changes that exist between the first subsequent hierarchical structure and the second subsequent hierarchical structure.

15. A non-transitory computer-readable medium that stores instruction that when executed by a processor, causes the processor to:
generate a first image of a first plurality of memory blocks stored in a first database that includes a first hierarchical structure of the first plurality of memory blocks, wherein the first plurality of memory blocks are operable to store a first set of user data;
generate a second image of a second plurality of memory blocks in a second database that includes a second hierarchical structure of the second plurality of memory blocks, wherein the second plurality of memory blocks are operable to store a second set of user data, wherein at least a portion of the second set of user data in the second plurality of memory blocks are a replication of the first set of user data in the first plurality of memory blocks;
process the first image and the second image to identify one or more visual changes between the first hierarchical structure in the first image and the second hierarchical structure in the second image, wherein the one or more visual changes includes one or more of: an empty memory block indicative of deleted user data, a color embedded memory block indicative of updated user data, or a new memory block indicative of new user data;

determine whether the second hierarchical structure and the first hierarchical structure are desynchronized based on the one or more visual changes that exist between the first hierarchical structure in the first image and the second hierarchical structure in the second image; and in response to determining that the second hierarchical structure and the first hierarchical structure are desynchronized, the processor is further configured to:

synchronize the first set of user data in the first plurality of memory blocks and the second set of user data in the second plurality of memory blocks, wherein synchronizing includes updating either the first set of user data in the first plurality of memory blocks or the second set of user data in the second plurality of memory blocks to include user data associated with the one or more visual changes that exist between the first hierarchical structure and the second hierarchical structure.

16. The non-transitory computer-readable medium of claim 15, wherein during generating the first image and the second image, the instructions when executed by the processor cause the processor to:

map the first set of user data in the first database to replicated user data in the second database;

identify a first memory block in the first database that comprises the updated user data relative to a corresponding first memory block in the second database; and process the first hierarchical structure in the first image to embed a color in the first memory block to generate a first color embedded memory block indicative of the updated user data.

17. The non-transitory computer-readable medium of claim 15, wherein the instructions when executed by the processor cause the processor to:

generate a third image of a third plurality of memory blocks in a third database that includes a third hierarchical structure of the third plurality of memory blocks, wherein the third plurality of memory blocks are operable to store a third set of user data, wherein at least a portion of the third set of user data in the third plurality of memory blocks are a replication of the first set of user data stored in the first plurality of memory blocks;

process the third image to identify the one or more visual changes between the first hierarchical structure, the second hierarchical structure, and the third hierarchical structure;

determine that the second hierarchical structure in the second image and the third hierarchical structure in the third image are synchronized;

determine that the first hierarchical structure in the first image is desynchronized from the second hierarchical structure and the third hierarchical structure based on the one or more visual changes that exist between the first hierarchical structure, the second hierarchical structure, and the third hierarchical structure; and in response to determining that the first image is desynchronized, the processor is further configured to:

synchronize the first set of user data in the first plurality of memory blocks and with the second set of user data in the second plurality of memory blocks and the third set of user data in the third plurality of memory blocks based on the one or more visual changes.

18. The non-transitory computer-readable medium of claim 15, wherein the instructions when executed by the processor cause the processor to:

generate a third image of a third plurality of memory blocks in a third database that includes a third hierarchical structure of the third plurality of memory blocks, wherein the third plurality of memory blocks are operable to store a third set of user data, wherein at least a portion of the third set of user data in the third plurality of memory blocks are a replication of the first set of user data stored in the first plurality of memory blocks;

generate a fourth image of a fourth plurality of memory blocks in a fourth database that includes a fourth hierarchical structure of the fourth plurality of memory blocks, wherein the fourth plurality of memory blocks are operable to store a fourth set of user data, wherein at least a portion of the fourth set of user data in the fourth plurality of memory blocks are a replication of the first set of user data stored in the first plurality of memory blocks;

process the first image, the second image, the third image, and the fourth image to identify the one or more visual changes between the first hierarchical structure, the second hierarchical structure, the third hierarchical structure, and the fourth hierarchical structure;

determine that that the second hierarchical structure and the third hierarchical structure are synchronized;

determine that the first hierarchical structure and the fourth hierarchical structure are desynchronized based on the one or more visual changes that exist between the first hierarchical structure, the second hierarchical structure, the third hierarchical structure, and the fourth hierarchical structure; and in response to determining that the first hierarchical structure and the fourth hierarchical structure are desynchronized, the processor is further configured to:

synchronize the first set of user data in the first plurality of memory blocks with the second set of user data in the second plurality of memory blocks and the third set of user data in the third plurality of memory blocks based on the one or more visual changes; and synchronize the fourth set of user data in the fourth plurality of memory blocks with the second set of user data in the second plurality of memory blocks and the third set of user data in the third plurality of memory blocks based on the one or more visual changes.

19. The non-transitory computer-readable medium of claim 15, wherein the instructions when executed by the processor cause the processor to:

partition the first image of the first plurality of memory blocks into user defined regions;

partition the second image of the second plurality of memory blocks into the user defined regions;

process the first image and the second image using a machine learning model and a user defined scanning route to identify a pattern of regions within the user defined regions that comprise the one or more visual changes, wherein the machine learning model is trained on a plurality of stored hierarchical structures, and wherein the user defined scanning route is configured to define a route for traversing through the user defined regions to perform the processing; and generate an updated scanning route using the machine learning model, wherein the updated scanning route is based at least in part on the pattern of regions that comprise the one or more visual changes, and wherein the updated scanning route is configured to define an updated route for traversing through the user defined regions, wherein the updated route for traversing through the user defined regions prioritizes traversing through the pattern of regions comprising the one or more visual changes before traversing through alternative regions in the user defined regions.

20. The non-transitory computer-readable medium of claim 19, wherein the instructions when executed by the processor cause the processor to:
generate a first subsequent image of the first plurality of memory blocks after a user defined duration has elapsed, wherein the first subsequent image of the first plurality of memory blocks comprises a first subsequent hierarchical structure of the first plurality of memory blocks;
generate a second subsequent image of the second plurality of memory blocks after the user defined duration has elapsed, wherein the second subsequent image of the second plurality of memory blocks comprises a second subsequent hierarchical structure of the second plurality of memory blocks;
partition the first subsequent image of the first plurality of memory blocks into the user defined regions;
partition the second subsequent image of the second plurality of memory blocks into the user defined regions;
process the first subsequent image and the second subsequent image to identify the one or more visual changes between the first subsequent hierarchical structure in the first subsequent image and the second subsequent hierarchical structure in the second subsequent image, wherein the processing follows the updated scanning route;
determine whether the second subsequent hierarchical structure and the first subsequent hierarchical structure are desynchronized based on the one or more visual changes that exist between the first subsequent hierarchical structure in the first subsequent image and the second subsequent hierarchical structure in the second subsequent image; and
in response to determining that the second subsequent hierarchical structure and the first subsequent hierarchical structure are desynchronized, the processor is further configured to:
synchronize the first set of user data in the first plurality of memory blocks and the second set of user data in the second plurality of memory blocks, wherein synchronizing includes updating either the first set of user data in the first plurality of memory blocks or the second set of user data in the second plurality of memory blocks to include user data associated with the one or more visual changes that exist between the first subsequent hierarchical structure and the second subsequent hierarchical structure.

\* \* \* \* \*